(12) United States Patent
Maddukuri

(10) Patent No.: US 12,726,356 B2
(45) Date of Patent: Sep. 1, 2026

(54) MULTI-LEDGER FRAMEWORK FOR TRUST OVER IP DATA EXCHANGE

(71) Applicant: American Express Travel Related Services Company, Inc., New York, NY (US)

(72) Inventor: Ajay B. Maddukuri, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 260 days.

(21) Appl. No.: 18/359,530

(22) Filed: Jul. 26, 2023

(65) Prior Publication Data

US 2025/0038984 A1 Jan. 30, 2025

(51) Int. Cl.
*H04L 9/32* (2006.01)

(52) U.S. Cl.
CPC .................................. *H04L 9/3218* (2013.01)

(58) Field of Classification Search
None
See application file for complete search history.

(56) References Cited

U.S. PATENT DOCUMENTS

2019/0245699 A1* 8/2019 Irwan .................... H04L 9/0618
2021/0360031 A1* 11/2021 Novotny ................. H04L 63/20

FOREIGN PATENT DOCUMENTS

CN 113806699 * 5/2020
CN 113507458 * 6/2021

OTHER PUBLICATIONS

Ghosh; Bishakh et al. "Decentralized Cross-Network Identity Management for Blockchain Interoperation" [online] IEEE, May 3, 2021 [retrieved Nov. 15, 2025]. Retrieved from the Internet: URL: https://ieeexplore.ieee.org/document/9461064 (Year: 2021).*

Hartog; Kyle et al. "Indy DID Method" [online] HackMD, Jul. 15, 2022 [retrieved Nov. 15, 2025]. Retrieved from the Internet: URL: https://hackmd.io/@kdenhartog/S1eUS2BQw (Year: 2022).*

* cited by examiner

*Primary Examiner* — Taghi T Arani
*Assistant Examiner* — Joshua Raymond White
(74) *Attorney, Agent, or Firm* — Thomas | Horstemeyer, LLP

(57) ABSTRACT

Disclosed are various embodiments for facilitating a multi-ledger framework in a trust over internet protocol (TOIP) environment. A listing of ledgers can be maintained by a ledger registry. Entities in the TOIP environment can retrieve a listing of ledgers and cache the contents of the ledgers so that the contents can be accessed if a particular ledger is inaccessible.

20 Claims, 6 Drawing Sheets

Wallet Service 112
109
103
DID 121
VC 118
Proof 125
Issuer Computing Environment 101
Ledger Registry 131
Verifier Computing Environment 105
Issuer DID 121
Issuer DID 121
Distributed Ledger(s) 115
100

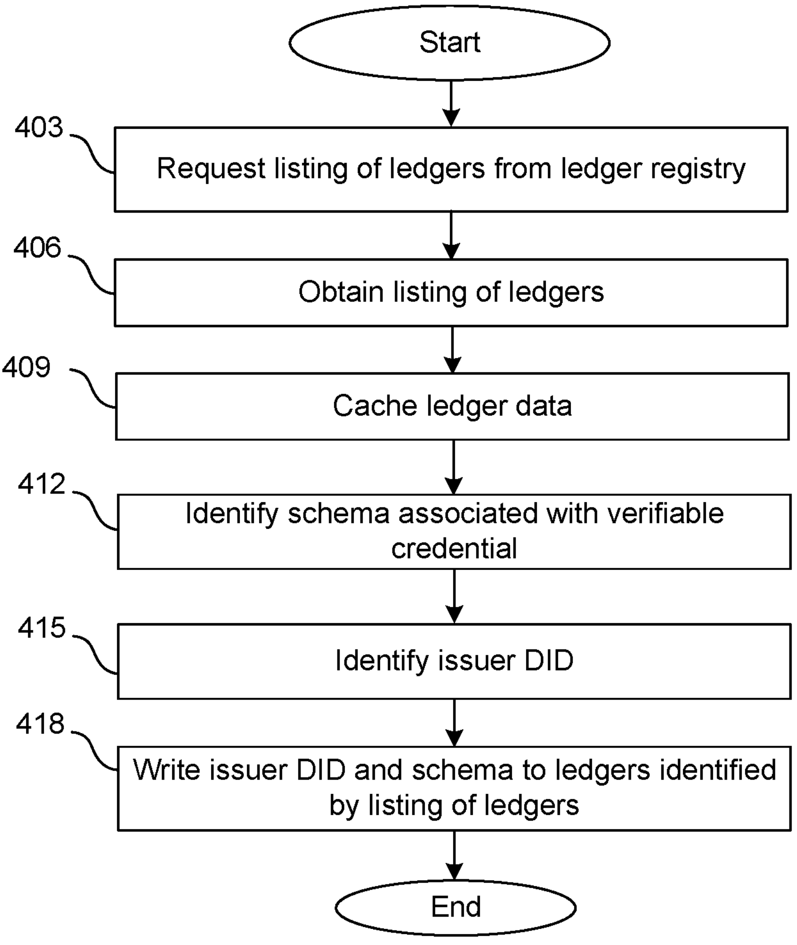
FIG. 4

MULTI-LEDGER FRAMEWORK FOR TRUST OVER IP DATA EXCHANGE

BACKGROUND

Trust over internet protocol (TOIP) defines an architecture for digital trust on the internet. Entities in a TOIP environment can include issuers of credentials, holders of credentials, and verifiers of credentials. A TOIP environment often relies upon decentralized identifiers (DIDs) that identify the entities in the environment. Additionally, the different entities in a TOIP environment can utilize various ledgers to distribute information such as public keys. However, in a heterogeneous TOIP environment where different entities are utilizing different ledgers, there can exist a gap where the entities are unable to provide their respective public keys and other information necessary to issue or verify credentials.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 4 is a flowchart illustrating one example of functionality implemented as portions of an application executed in a computing environment in the network environment of FIG. 2 according to various embodiments of the present disclosure.

DETAILED DESCRIPTION

Figure 1:
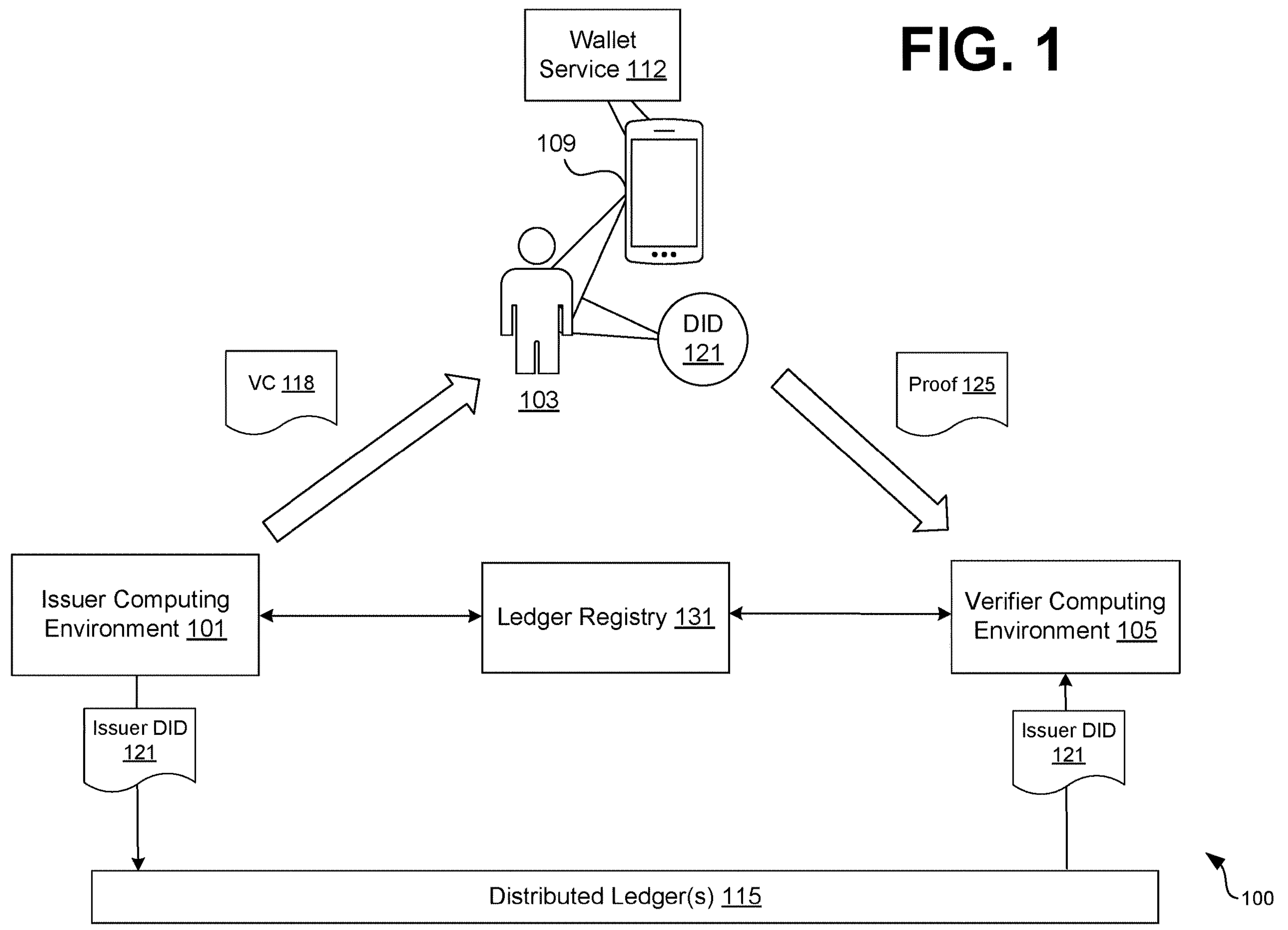
FIG. 1 is a drawing depicting one of several embodiments of the present disclosure.

Disclosed are various approaches for utilizing multiple ledgers in a trust over internet protocol (ToIP) framework. ToIP is a multi-layer protocol stack that enables digital trust without relying on intermediaries. ToIP can provide a decentralized trust layer for the Internet. Applications can be built using decentralized identifiers (DIDs). A DID can be a permanent identifier for an entity, also termed a DID subject, such as an issuer, a holder, or a verifier. A DID can be resolved into a DID document that describes various properties of the DID subject, such as a public key associated with the DID subject and potentially one or more service endpoints needed to interact with or verify the identity of the DID subject.

A DID can be registered onto a distributed ledger, a blockchain, or other decentralized system, referred to herein collectively as distributed ledgers. Other systems or devices can access information associated with the DID registered onto a distributed ledger, such as the DID document, which can contain a public key associated with the entity or DID subject. A DID is also decentralized. Unlike a phone number or domain name, a DID does not require a centralized registrar. Instead, an entity can create a DID using an application, such as a wallet service. An issuer, which can represent an entity such as a bank, financial institution, credit card company, government entity, or another person, can issue a verifiable credential 118 to a holder of the verifiable credential 118, which can be stored in a digital wallet of the user. The verifiable credential 118 can be held only by the holder and no other centralized authority or registrar. A verifiable credential can contain claims or attestations made by the issuer about a holder of the verifiable credential. For example, an issuer can attest to the identity or other aspect of a holder of which the issuer can attest.

However, the issuer of the verifiable credential can provide data in the verifiable credential that allows the holder of the verifiable credential to verify the verifiable credential provided by the issuer to another entity, referred to as a verifier. A verifiable credential can be verified without the credential being provided to the verifier by the issuer or the holder of the verifiable credential. Instead, a verifiable credential proof can be presented to the verifier, which the verifier can use to cryptographically verify that the holder possesses a valid verifiable credential 118 and certain information in the verifiable credential. In this way, the holder can allow the verifier to verify the verifiable credential without surrendering the verifiable credential itself to the verifier.

One or more distributed ledgers are utilized in a TOIP framework. The distributed ledgers can be utilized by an issuer to publish a DID of the issuer, which can contain or reference a public key of the issuer. The issuer can also publish a schema of one or more verifiable credentials issued by the issuer to one or more distributed ledgers so that verifiers can utilize the schema to verify holders of a verifiable credential issued by the issuer. The schema can specify how a proof generated by a holder's device, or a wallet application on the holder's device, can be utilized to verify a verifiable credential held by the wallet application. The issuer DID and/or schema can be distributed to other verifiers through distributed ledgers. Additionally, the DID of holders can also be published on distributed ledgers.

In the current TOIP environment, various issuers, holders, and verifiers utilize different distributed ledgers. For example, an application utilized by an issuer might have compatibility with a first distributed ledger but not a second distributed ledger. An application utilized by a verifier might be compatible with the second distributed ledger but not the first, which can render it impossible for the verifier to retrieve an issuer DID or schema of a verifiable credential to verify a holder of a verifiable credential issued by the issuer.

Accordingly, examples of the disclosure provide a multi-ledger framework that can be utilized in a TOIP environment to support multiple ledgers that issuers, holders, and verifiers can utilize.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Referring next to FIG. 1, shown is a TOIP environment 100 according to the disclosure. The TOIP environment 100 illustrates the "trust triangle" that shows some of the actors that could be involved in one or more transactions or interactions that utilize DIDs, verifiable credential 118, and distributed ledgers 115 according to examples of the disclosure. As shown in FIG. 1, the trust triangle involves an issuer, represented by an issuer computing environment 101, a user 103, and a verifier, represented by a verifier computing environment 105.

The issuer, via the issuer computing environment 101, can issue a verifiable credential 118 to a user 103. The verifiable credential 118 can be provided to a client device 109 of the user 103. The client device 109 can execute a wallet service 112, which is an application that can store a verifiable credential 118 issued to a user 103. The wallet service 112 can also interact with a verifier computing environment 105 of a verifier on behalf of a user 103.

A ledger registry 131 can be in communication with the issuer computing environment 101, the verifier computing environment 105, and in some cases, a client device 109 associated with users. The ledger registry 131 can provide a listing of ledgers 115 that are utilized by various issuers, verifiers, and wallet services 112 that are utilized by various entities in the trust triangle. Ledgers can be identified within the ledger registry 131 in various ways. In one example, an entry within the ledger registry 131 that corresponds to a ledger can include a file, such as a genesis file, that includes an IP address for one or more nodes comprising the ledger. In another example, an entry corresponding to a ledger on the ledger registry 131 can include a listing of addresses for one or more of the nodes comprising the ledger. An entity in the TOIP environment can contact a node identified in the ledger registry 131 to obtain a copy of the ledger or to obtain a specific DID that is stored on the ledger.

Again, the issuer can generate a verifiable credential 118 according to a schema that defines the format and other properties associated with the verifiable credential 118. The schema can define how a verifier can verify a verifiable credential 118 of the issuer based upon a verifiable credential proof presented by a user's wallet service 112 to the verifier computing environment 105.

According to various examples, the verifier computing environment 105 can establish a session, in some cases an interactive session, with a wallet service 112 executed by a client device 109 to verify a verifiable credential 118 issued to the user by an issuer. The session can be established for various purposes, such as conducting financial transactions, verifying the identity of a user, or verifying any credentials of the user that are issued electronically as a verifiable credential 118.

The user can be associated with a DID 121. A DID 121 corresponds to an identifier that enables verifiable, decentralized digital identity of a subject (e.g., person, organization, thing, etc.). In this example, the DID 121 can be used to represent the identity of the user 103. In various examples, a DID 121 can correspond to an address to a DID document 124 (FIG. 2) that includes information associated with the DID subject (e.g., user 103). In various examples, the DID 121 can be implemented using various standards, such as a version of the World Wide Web Consortium's (W3C's) Decentralized Identifier (DID) standard.

In various examples, the user 103 interacting with the client device 109 can provide a DID 121 to the verifier computing environment 105 in exchange for a verifier public key 130 that can be used by the client device 109 and/or wallet service 112 associated with the user 103 to authenticate the client device 109 in future interactions. In various examples, the client device 109 can access the corresponding DID document 124 using the DID 121 and obtain a wallet address to interact with a wallet service 112 associated with the user 103. In some examples, the wallet service 112 can correspond to a cloud-based service. In other examples, the wallet service 112 corresponds to a service that is executed by the client device 109.

In various examples, the verifier computing environment 105 can establish a first communication channel (e.g., WebSocket, gRPC, etc.) with the wallet service 112 upon determining the wallet address or pathway associated with the wallet service 112. In various examples, the verifier computing environment 105 can be identified by the wallet service 112 based at least in part on the verifier public key that is shared in the initial interaction. For example, the verifier computing environment 105 can sign any cryptographic challenges sent to the verifier computing environment 105 for user verification using a verifier private key 136. In this example, the verifier public key 130 can be used to verify the signature of the cryptographic challenge thereby authenticating the verifier computing environment 105.

In various examples, the user 103 can further correspond to a credential holder having one or more verifiable credentials 118 issued by an issuer. In various examples, a verifiable credential 118 corresponds to a digital credential used to identify an attribute (e.g., qualification, component, authority, achievement, personally quality, etc.) associated with the credential holder (e.g., user 103). For example, the verifiable credential 118 can be associated with the user 103 by being linked with and/or otherwise associated with the DID 121 of the user 103. The verifiable credential 118 can include information represented by a physical credential (e.g., passport, driver's license, birth certificate, etc.) or a non-physical credential (e.g., bank account ownership, etc.) that identifies one or more attributes associated with the user 103. In various examples, a verifiable credential 118 of the user 103 can be stored in a wallet that is accessible by the wallet service 112. The wallet service 112 can provide a verifiable credential proof 125 to the client device 109 upon establishment of the interactive session. In various examples, verifier computing environment 105 can extract content from the verifiable credential proof 125 that can be used to verify responses received from the wallet service 112.

In some implementations, rather than presenting a verifiable credential proof 125 to the verifier computing environment 105, the wallet service 112 can present a verifiable presentation of the verifiable credential 118 that expresses data from the verifiable credential 118 and that is packaged in such a way that the authorship of the data is verifiable.

To verify a verifiable credential proof 125 based upon a verifiable credential 118 that is received from a wallet service 112, the verifier computing environment 105 can retrieve a DID 121 corresponding to the issuer from a ledger 115. The DID 121 of the user 103 and the issuer can be determined from the verifiable credential proof 125 obtained from the wallet service 112. The issuer DID 121 can reference or contain a schema defining the verifiable credential 118 from which the verifiable credential proof 125 is created. The issuer DID 121 can also contain or reference a public key of the issuer. Using the schema and the public key, the verifier computing environment 105 can verify the user 103 based upon the verifiable credential proof 125 obtained from the client device 109 of the user 103. The issuer computing environment 101 can publish the DID 121

The ledger 115 can be a distributed ledger. In some scenarios, there can be ledgers 115 that are utilized by various entities in a TOIP framework due to a design choice of an application designer, a particular software vendor that is chosen, or other reasons.

Accordingly, the issuer computing environment 101, the client device 109, and/or the verifier computing environment 105, can communicate with the ledger registry 131 to determine all of the available ledgers 115 that are registered with the ledger registry 131. The issuer computing environment 101 can store a DID 121 corresponding to the issuer on ledgers 115 rather than only one that might be referenced by the DID 121. Similarly, the wallet service 112 and/or verifier computing environment 105 can store a DID 121 corresponding to the user 103 or verifier, respectively, on multiple ledgers 115 rather than only one that might be referenced by the DID 121 of the user 103 or verifier. In this way, if a verifier computing environment 105 or other system is unable to access the distributed ledgers 115 referenced by the DID 121 or otherwise utilized by an issuer or other entity, the verifier can still verify a verifiable credential 118 by retrieving the schema or public key from another ledger.

As another use for the ledger registry 131, an issuer computing environment 101, a verifier computing environment 105 or wallet service 112, or other application can discover which ledgers 115 are being utilized by other entities in a TOIP environment from the ledger registry 131. A system corresponding to an entity can then cache the data stored on the various ledgers 115 so that a credential can be verified by the verifier computing environment 105, for example, without requiring a content connection to the internet. Additionally, caching the contents of the distributed ledgers 115 utilized by various entities can also speed the process of verification of a verifiable credential 118 associated with a user 103.

Figure 2:
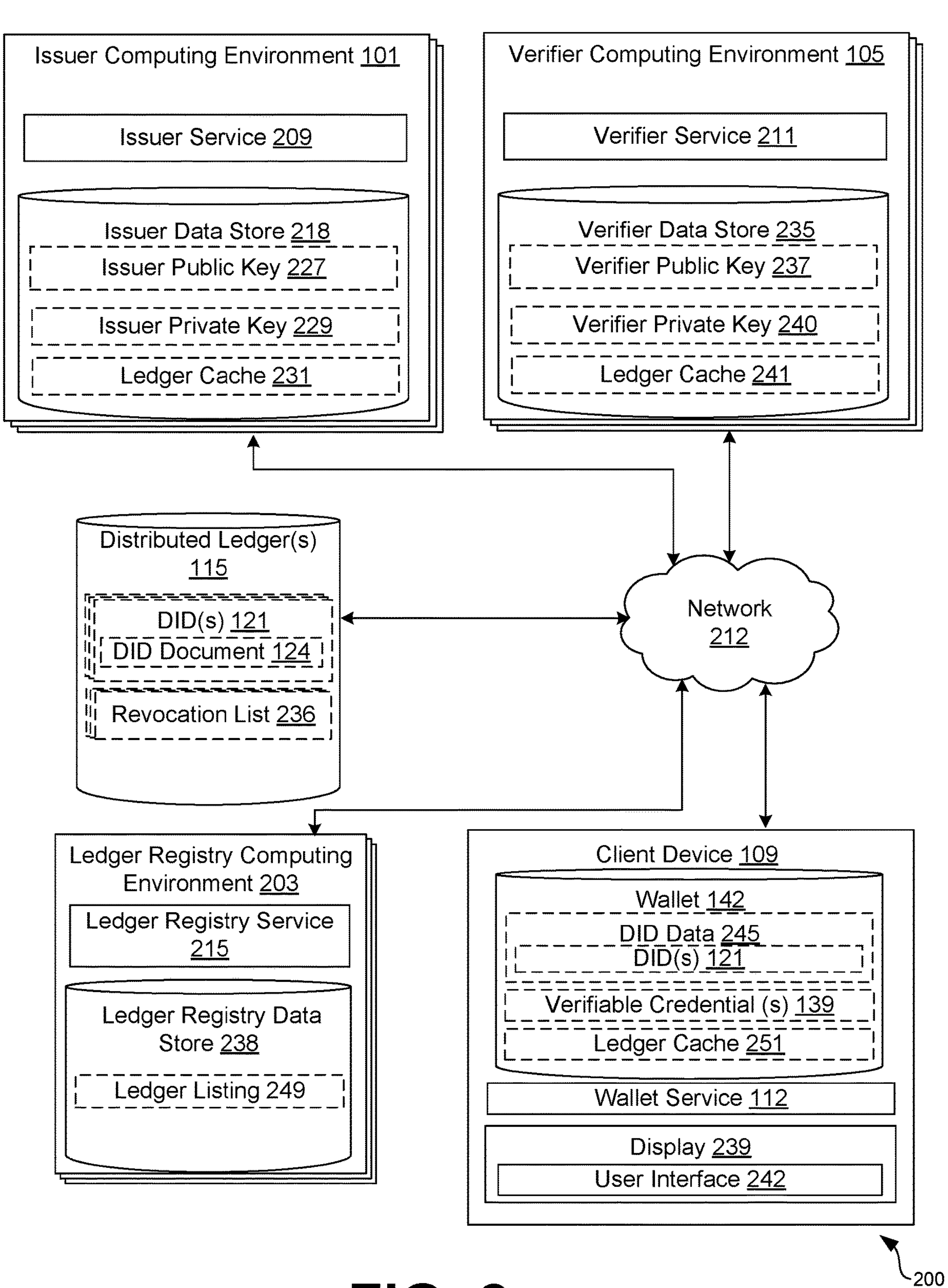
FIG. 2 is a drawing of a network environment according to various embodiments of the present disclosure.

With reference to FIG. 2, shown is a network environment 200 according to various embodiments. The network environment 200 can include an issuer computing environment 101, a verifier computing environment 105, one or more ledgers 115, a ledger registry computing environment 203 implementing a ledger registry 131, and one or more client devices 109, which can be in data communication with each other via a network 212.

The network 212 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 212 can also include a combination of two or more networks 212. Examples of networks 212 can include the Internet, intranets, extranets, virtual private networks (VPNs), and similar networks.

The issuer computing environment 101, verifier computing environment 105, and ledger registry computing environment 203 can each include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the issuer computing environment 101, verifier computing environment 105, and ledger registry computing environment 203 can each employ a plurality of computing devices that can be arranged in one or more server banks or computer banks or other arrangements. Such computing devices can be located in a single installation or can be distributed among many different geographical locations. For example, the issuer computing environment 101, verifier computing environment 105, and ledger registry computing environment 203 can include a plurality of computing devices that together can include a hosted computing resource, a grid computing resource, or any other distributed computing arrangement. In some cases, the issuer computing environment 101, verifier computing environment 105, and ledger registry computing environment 203 can correspond to an elastic computing resource where the allotted capacity of processing, network, storage, or other computing-related resources can vary over time.

Various applications or other functionality can be executed in the issuer computing environment 101. The components executed on the issuer computing environment 101 include an issuer service 209, and other applications, services, processes, systems, engines, or functionality not discussed in detail herein. The issuer service 209 can be executed by or on behalf of an issuer of verifiable credentials 118 to oversee the issuance and management of credentials issued to holders of the verifiable credentials 118.

The issuer service 209 can generate a verifiable credential 118 on behalf of a holder, or a user 103, and provide the verifiable credential 118 to a client device 109 of the user 103. The client device 109 can be running a wallet service 112, which can hold the verifiable credential 118 and facilitate interactions with other systems, such as verifiers to which the user 103 might want to verify their respective verifiable credential 118. An issuer can correspond to a financial institution, government agency, enterprise, or any entity that wants to issue a credential to a holder of the credential for use with other entities, referred to in the TOIP model as verifiers.

For example, the issuer service 209 can establish a session with a wallet service 112 of a user 103 to provide a verifiable credential 118 to the user 103. The verifiable credential 118 can be stored on the client device 109 of the user. The verifiable credential 118 can be generated based upon a DID 121 identifying the user 103 or a wallet of the user.

In some examples, portions of the verifiable credential 118 can be signed by an issuer private key 127 that corresponds to an issuer public key 129. The issuer public key 129 can be published on one or more ledgers 115 so that it can be accessed by a verifier computing environment 105 to verify a verifiable credential 118 or verifiable credential proof 125 that can be presented to the verifier computing environment 105 by a user 103 via a client device 109.

Also, various data is stored in an issuer data store 218 that is accessible to the issuer computing environment 101. The issuer data store 218 can be representative of a plurality of issuer data stores 218, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the issuer data store 218 is associated with the operation of the various applications or functional entities described below. This data can include an issuer public key 227, an issuer private key 229, a ledger cache 231, and potentially other data.

The issuer public key 227 represents a public key of an issuer that can be utilized by other entities to validate data that is signed by a corresponding private key, which is the issuer private key 229. The issuer service 209 can generate a verifiable credential 118 and sign data embedded in the verifiable credential 118 with an issuer private key 229. Other entities, such as a verifier, can verify the contents of a verifiable credential 118 or a verifiable credential proof 125 utilizing the issuer private key 229.

Additionally, the issuer data store 218 can store a ledger cache 231. The issuer service 209 can communicate with a ledger registry computing environment 203 to retrieve a listing of distributed ledgers that are utilized by various entities in a TOIP environment. The issuer service 209 can periodically retrieve the contents of the distributed ledgers 115 and cache them in the ledger cache 231. In this way, the issuer service 209 can access a particular DID 121, public key, schema from the ledger cache 231 in the event of the issuer computing environment 101 losing access to the network 212. Additionally, the issuer service 209 can utilize the listing of ledgers retrieved from the ledger registry computing environment 203 to store its own DID 121, issuer public key 227, a schema corresponding to a verifiable credential 118, and other data that can be accessed by other entities on the various ledgers 115 that are registered with the ledger registry computing environment 203.

Various applications or other functionality can be executed in the verifier computing environment 105. The components executed on the verifier computing environment 105 include a verifier service 211, and other applications, services, processes, systems, engines, or functionality not discussed in detail herein. The verifier service 211 can be executed by or on behalf of a verifier of verifiable credentials 118 to perform verification of verifiable credentials 118 issue by an issuer.

The verifier service 211 can verify a verifiable credential 118 received from a client device 109 on behalf of a user. The client device 109 can be running a wallet service 112, which can hold the verifiable credential 118 and facilitate interactions with the verifier service 211. A verifier can correspond to a financial institution, government agency, enterprise, or any entity that wants to verify a credential of a holder of the credential.

For example, the verifier service 211 can establish a session with a wallet service 112 of a user 103 to obtain a verifiable credential 118 or a verifiable credential proof 125 corresponding to the verifiable credential 118. The verifiable credential 118 can be stored on the client device 109 of the user. The verifiable credential 118 can be generated based upon a DID 121 identifying the user 103 or a wallet of the user.

As noted above, portions of the verifiable credential 118 or verifiable credential proof 125 can be signed by an issuer private key 127 that corresponds to an issuer public key 129. The issuer public key 129 can be published on one or more ledgers 115 so that it can be accessed by the verifier computing environment 105 to verify a verifiable credential 118 or verifiable credential proof 125 that can be presented to the verifier computing environment 105 by a user 103 via a client device 109.

Also, various data is stored in a verifier data store 235 that is accessible to the verifier computing environment 105. The verifier data store 235 can be representative of a plurality of verifier data stores 235, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the verifier data store 235 is associated with the operation of the various applications or functional entities described below. This data can include a verifier public key 237, a verifier private key 240, a ledger cache 241, and potentially other data.

The verifier public key 237 represents a public key of a verifier that can be utilized by other entities to validate data that is signed by a corresponding private key, which is the issuer private key 229. The verifier service 211 can verify a verifiable credential 118 based upon data embedded in the verifiable credential 118 based upon the contents of a verifiable credential 118 or a verifiable credential proof 125.

Additionally, the verifier data store 235 can store a ledger cache 241. The verifier service 211 can communicate with a ledger registry computing environment 203 to retrieve a listing of distributed ledgers that are utilized by various entities in a TOIP environment. The verifier service 211 can periodically retrieve the contents of the distributed ledgers 115 and cache them in the ledger cache 241. In this way, the verifier service 211 can access a particular DID 121, public key, schema or other data from the ledger cache 241 in the event of the verifier computing environment 105 losing access to the network 212. Additionally, the verifier service 211 can utilize the listing of ledgers retrieved from the ledger registry computing environment 203 to store its own DID 121, issuer public key 227, a schema corresponding to a verifiable credential 118, and other data that can be accessed by other entities on the various ledgers 115 that are registered with the ledger registry computing environment 203.

Various applications or other functionality can be executed in the ledger registry computing environment 203. The components executed on the ledger registry computing environment 203 include a ledger registry service 215, and other applications, services, processes, systems, engines, or functionality not discussed in detail herein. The ledger registry service 215 can be executed by or on behalf of a maintainer of a ledger registry and includes a listing of ledgers that are utilized by various entities in the network environment 200. A ledger registry can be maintained so that issuers, verifiers, or other entities can retrieve a listing of ledgers that are utilized by entities in the environment. The systems communicating with the registry can cache the contents of the respective ledgers 115 that are registered with the ledger registry.

The ledger registry computing environment 203 can execute a ledger registry service 215. The ledger registry service 215 can communicate with entities in the network environment 200, such as the issuer computing environment 101, verifier computing environment 105, and client device 109 to provide a listing of the distributed ledgers 115 that are registered with a ledger registry. The ledger registry service 215 can identify the distributed ledgers 115 utilized by various entities in a TOIP environment and transmit a listing of ledgers to the requesting system. The distributed ledgers 115 can be identified by the entities that are utilizing the various registered ledgers. For example, a particular entity can be identified by its DID 121 and the ledgers that the entity linked to the DID 121 uses.

Also, various data is stored in a ledger registry data store 238 that is accessible to the ledger registry computing environment 203. The ledger registry data store 238 can be representative of a plurality of ledger registry data store 238, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the ledger registry data store 238 is associated with the operation of the ledger registry service 215. This data can include a ledger listing 249 and potentially other data.

The ledger listing 249 represents a listing of ledgers that the ledger registry computing environment 203 can maintain. The ledger listing 249 can be requested and retrieved by other entities, such as an issuer computing environment 101, a verifier computing environment 105, or a client device 109. The ledger listing 249 can identify a particular entity, such at its DID 121, and identify the distributed ledgers 115 that are utilized by the entity. In some cases, an entity might utilize more than one of the distributed ledgers 115.

The distributed ledgers 115 represent synchronized, eventually consistent, data stores spread across multiple nodes in different geographic or network locations. Each ledger 115 can represent a separate distributed ledger 115 that can be utilized by an entity to publish its respective DID 121 and other data for other entities in the network environment 200, such as a schema defining a verifiable credential 118 or a public key. Each node in a ledger 115 can contain a replicated copy of the ledger 115, including all data stored in the ledger 115. Records of transactions involving the ledger 115 can be shared or replicated using a peer-to-peer network connecting the individual nodes that form the ledger 115. Once a transaction or record is recorded in the ledger 115, it can be replicated across the peer-to-peer network until the record is eventually recorded with all nodes. Various consensus methods can be used to ensure that data is written reliably to the ledger 115. In some implementations, data, once written to the ledger 115, is immutable. Examples of a distributed data store that can be used for the distributed identity ledger can include various types of blockchains, distributed hash tables (DHTs), and similar data structures. Various data can be stored in the ledger 115. For example, the ledger 115 can include DIDs 121 associated with respective first users 103 and a revocation list 236.

A DID 121 corresponds to an identifier that enables verifiable, decentralized digital identity of a subject (e.g., person, organization, thing, etc.). In this example, the DID 121 can be used to represent the identity of the user 103. In various examples, a DID 121 can correspond to an address to a DID document 124 that includes information associated with the subject (e.g., user 103). For example, the DID document 124 can comprise a set of data describing the subject and can include various information (e.g., cryptographic keys, schemas) that can used to authenticate the subject. In various examples, the DID document 124 can include an address or pathway for accessing a wallet service 112 associated with the user 103. The revocation list 236 stored in the ledger 115 can be updated to indicate that a corresponding credential or DID 121 has been revoked. In various examples, the DID 121, the DID document 124, and the revocation list 236 can be implemented using various standards, such as the World Wide Web Consortium's (W3C's) Decentralized Identifier (DID) standard.

The client device 109 and the second user client device 148 are representative of a plurality of client devices that can be coupled to the network 212. The client device 109 and the second user client device 148 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 109 and the second user client device 148 can include one or more displays 239, such as liquid crystal displays (LCDs), gas plasma-based flat panel displays, organic light emitting diode (OLED) displays, electrophoretic ink ("E-ink") displays, projectors, or other types of display devices. In some instances, the display 239 can be a component of the client device 109 and the second user client device 148 or can be connected to the client device 109 and the second user client device 148 through a wired or wireless connection.

The client device 109 can be configured to execute various applications such as a wallet service 112 and/or other applications. The wallet service 112 can communicate with issuer computing environment 101, verifier computing environment 105 and other systems in response to initiation of an identity verification process and/or a communication session with a second user client device 148. In various examples, the wallet service 112 can be executed to generate DID data 245 comprising decentralized identifiers (DIDS) 121. In various examples, the wallet service 112 can store verifiable credentials 118 associated with the user 103 and issued by a trusted third party in the wallet 142 of the user 103.

In various examples, the wallet service 112 can be executed to communicate with the verifier service 211 to verify an identity of a user 103 based upon a verifiable credential 118 issued to the user 103 by an issuer computing environment 101. The wallet service 112 can communicate with the issuer computing environment 101 to conduct a transaction, such as a financial transaction, verification of an identity of a user 103, or any other transaction based upon a verifiable credential 118. The verifiable credential 118 can be issued to a DID 121 associated with the user 103.

The wallet service 112 can store and access the DID data 245 and verifiable credentials 118 from a corresponding wallet 142. In various examples, the wallet 142 corresponds to a digital identity wallet for securely storing the DID data 245, verifiable credentials 118, and storing the private keys (not shown) associated with one or more DIDs 121 created for the given user. The wallet 142 can comprise a hard wallet or a soft wallet. Although the wallet 142 is illustrated in FIG. 1 as being part of the client device 109, it is understood that the wallet 142 can comprise a separate storage device that can be attached to or otherwise communicatively coupled to the client device 109. In various examples, access to the wallet 142 can require a passcode that is provided by a user to the wallet service 112 to access the wallet 142. For example, the wallet service 112 generates and renders a pop-up box or other type of user interface component requesting the user enter a particular passcode. The passcode can comprise a numeric sequence of numbers (e.g., four to six digits) that is provided by the user. Upon receiving a matching access code, the wallet service 112 can access the DID data 245 stored on the wallet 142.

The DID data 245 included in the wallet 142 and generated by the wallet service 112 can include one or more DIDs 121 and corresponding key-pairs. A DID 121 corresponds to an identifier that enables verifiable, decentralized digital identity of a subject (e.g., person, organization, thing, etc.). In this example, the DID 121 can be used to represent the identity of the user 103. In various examples, a DID 121 can correspond to an address to a DID document 124 that includes information associated with the subject (e.g., user 103) and is stored in the ledger 115. A DID 121 can used by an individual to assert his or her identity to others and may be stored in the ledger 115 to allow others to verify the individual's identity. Accordingly, in some implementations, the DID 121 can include a public key of a public-private key pair controlled by the individual. A DID 121 can be implemented using a variety of approaches, such as the World Wide Web Consortium's (W3C's) Decentralized Identifier (DID) standard.

In various examples, a verifiable credential 118 corresponds to a digital credential used to identify an attribute (e.g., qualification, component, authority, achievement, personally quality, etc.) associated with the credential holder (e.g., user 103). For example, the verifiable credential 118 can be associated with the user 103 by being linked with and/or otherwise associated with the DID 121 of the user 103. The verifiable credential 118 can include information represented by a physical credential (e.g., passport, driver's license, birth certificate, etc.) or a non-physical credential (e.g., bank account ownership, etc.) that identifies one or more attributes associated.

Additionally, client device 109 can store a ledger cache 251. The wallet service 112 can communicate with a ledger registry computing environment 203 to retrieve a listing of distributed ledgers that are utilized by various entities in a TOIP environment. The wallet service 112 can periodically retrieve the contents of the distributed ledgers 115 and cache them in the ledger cache 251. In this way, the wallet service 112 can access a particular DID 121, public key, schema or other data from the ledger cache 251 in the event of the client device 109 losing access to the network 212. Additionally, the wallet service 112 can utilize the listing of ledgers retrieved from the ledger registry computing environment 203 to store its own DID 121, issuer public key 227, a schema corresponding to a verifiable credential 118, and other data that can be accessed by other entities on the various ledgers 115 that are registered with the ledger registry computing environment 203.

Figure 3:
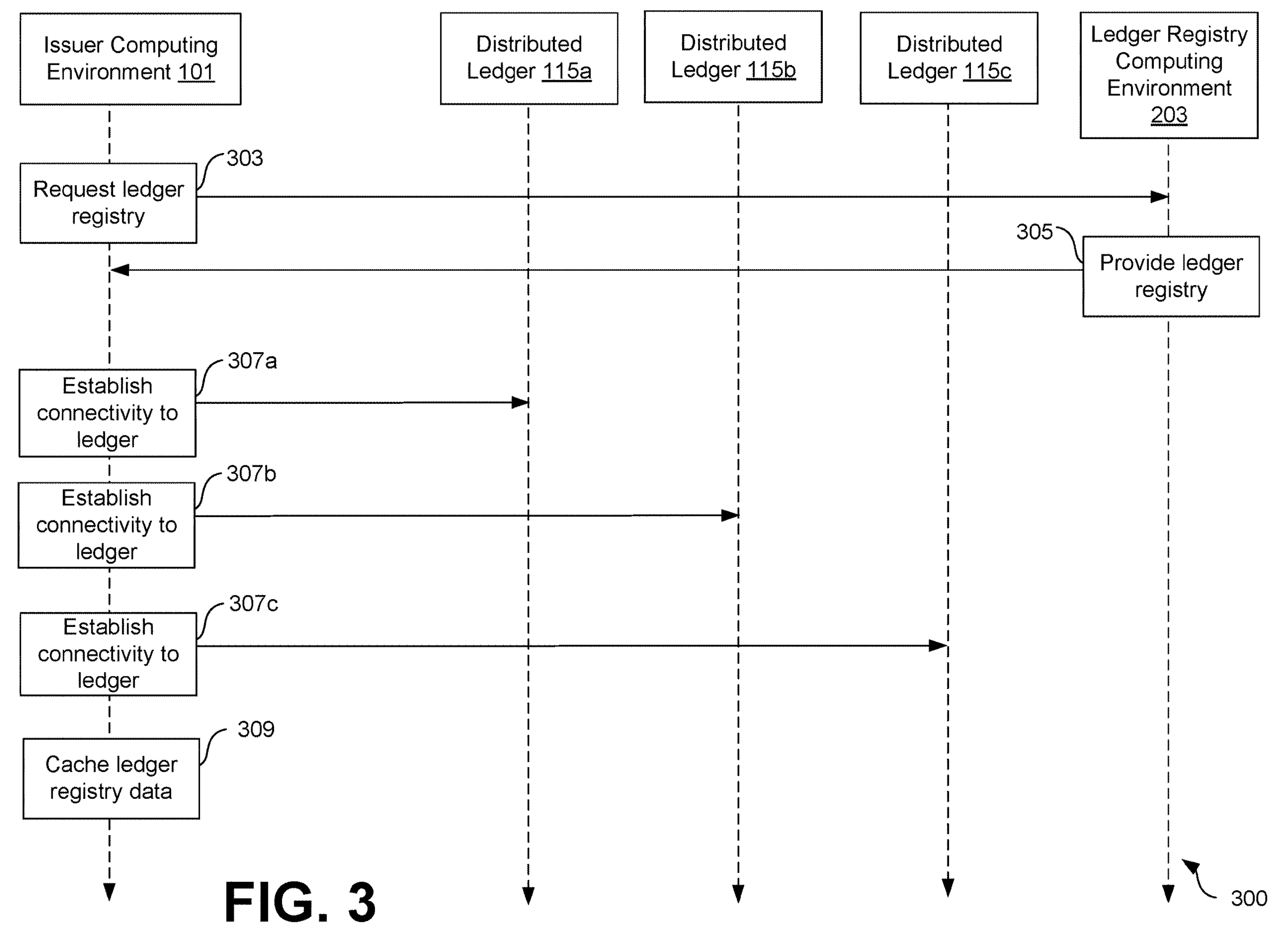
FIG. 3 is a sequence diagram according to various embodiments of the present disclosure.

Reference is now made to FIG. 3, which illustrates a sequence diagram 300 that provides an example of the operation of some of the components in the network environment 200. While the issuer computing environment 101 is shown in FIG. 3, it should be noted by the verifier computing environment 105 or the wallet service 112 can also operate as shown in the sequence diagram to retrieve a listing of ledgers from the ledger registry computing environment 203. The steps shown in FIG. 3 can be performed upon startup of the issuer computing environment 101 or the issuer service 209. The steps shown in FIG. 3 can also be performed periodically to cache the contents of the various ledgers 115 that are utilized by different entities in a TOIP environment.

As shown at step 303 in FIG. 3, the issuer computing environment 101 can request a ledger registry, or a listing of ledgers, from the ledger registry computing environment 203. The issuer computing environment 101 can request the listing of ledgers periodically to update a ledger cache 231 accessible to the issuer computing environment 101. As noted above, the ledger cache 231 can be utilized to access information stored on one of the distributed ledgers 115 whenever the issuer computing environment 101 does not have access to a network 212. Additionally, the listing of ledgers obtained from the ledger registry computing environment 203 can identify which ledgers are utilized by a particular entity.

Accordingly, at step 305, the ledger registry computing environment 203 can provide the listing of ledgers to the issuer computing environment 101. The listing of ledgers can identify the ledgers and a corresponding DID 121 of an entity that utilizes the particular ledger identified in the listing. At steps 307*a*, 307*b*, 307*c*, the issuer computing environment 101 can establish connectivity to the distributed ledgers 115 identified in the listing of ledgers. Although only three ledgers 115 are depicted in FIG. 3, it should be noted that fewer or more ledgers 115 can be utilized by various entities in a TOIP environment. In various examples, the issuer computing environment 101 can establish a communication channel (e.g., WebSocket, gRPC, etc.) with the respective ledgers 115 upon determining an address associated with each of the distributed ledgers 115.

At step 309, the issuer computing environment 101 can cache the contents of the respective ledgers 115. As noted above, system corresponding to an entity can cache the data stored on the various ledgers 115 so that the contents of the distributed ledgers 115 can be accessed without network access. For example, a verifiable credential 118 can be verified by the verifier computing environment 105, for example, without requiring a content connection to the internet. Additionally, caching the contents of the distributed ledgers 115 utilized by various entities can also speed the process of verification of a verifiable credential 118 associated with a user 103.

Referring next to FIG. 4, shown is a flowchart that provides one example of the operation of a portion of the issuer service 209. The flowchart of FIG. 4 provides merely an example of the many different types of functional arrangements that can be employed to implement the operation of the depicted portion of the issuer service 209 to store information such as a DID 121 and a schema specifying the format of a verifiable credential 118 to the distributed ledgers 115 identified by the ledger registry 131. As an alternative, the flowchart of FIG. 4 can be viewed as depicting an example of elements of a method implemented within the network environment 200.

First, at step 403, the issuer service 209 can request a listing of ledgers from the ledger registry computing environment 203. The ledger registry 131 provided by the ledger registry computing environment 203 can comprise a registry of ledgers 115 that can be utilized by various entities in the network environment 200 of FIG. 2. Stated another way, a ledger registry 131 can be in communication with the issuer computing environment 101, the verifier computing environment 105, and in some cases, a client device 109 associated with users. The ledger registry 131 can provide a listing of ledgers 115 that are utilized by various issuers, verifiers, and wallet services 112 that are utilized by various entities in the trust triangle of FIG. 1.

At step 406, the issuer service 209 can obtain the listing of ledgers from the ledger registry computing environment 203. The listing of ledgers can be obtained periodically from the ledger registry 131 and/or upon startup of the issuer service 209 on the issuer computing environment 101. At step 409, the issuer service 209 can cache the listing of ledgers in the ledger cache 231.

At step 412, the issuer service 209 can identify a schema defining the format associated with a verifiable credential 118 to be issued to a user 103. The schema can define the claims or attestations that are associated with the verifiable credential 118 and specify how a verifier can verify the verifiable credential 118 or a verifiable credential proof 125 generated by the wallet service 112 of a user 103 on behalf of the user and presented to the verifier service 211. For example, the schema can specify what information about the holder is contained within the verifiable credential 118 and how a verifier can verify the information using an issuer public key 227.

At step 415, the issuer service 209 can identify a DID 121 that identifies the issuer. The DID 121 can be embedded into the verifiable credential 118 generated by the issuer service 209 for users so that a verifier can identify the issuer public key 227 with which the verifiable credential 118 or a verifiable credential proof 125 can be verified by the verifier. The DID 121 can be associated with a DID document 124 and associated data. For example, the DID document 124 can contain or reference the location of the issuer public key 227. The DID 121 can also identify one or more of the distributed ledgers 115 on which the DID document 124 is published.

At step 418, the DID 121 of the issuer and the schema defining the verifiable credential 118 can be published to the one or more ledgers 115 utilized by the issuer. By publishing the DID 121 and schema onto one or more of the distributed ledgers 115, a verifier can retrieve the DID 121 of the issuer, the schema, and other information needed to verify a verifiable credential 118 that is presented by a wallet service 112 to the verifier service 211. The DID 121 of the issuer can be included in a verifiable credential 118 or a verifiable credential proof 125 presented to the verifier by the wallet service 112 of a user 103. The DID 121 of the issuer can reference a ledger 115 on which the DID document 124 is published. Alternatively, the verifier can also utilize a listing of ledgers obtained from the ledger registry computing environment 203 to identify a ledger 115 on which the DID document 124 is published. Thereafter, the process can proceed to completion.

Figure 5:
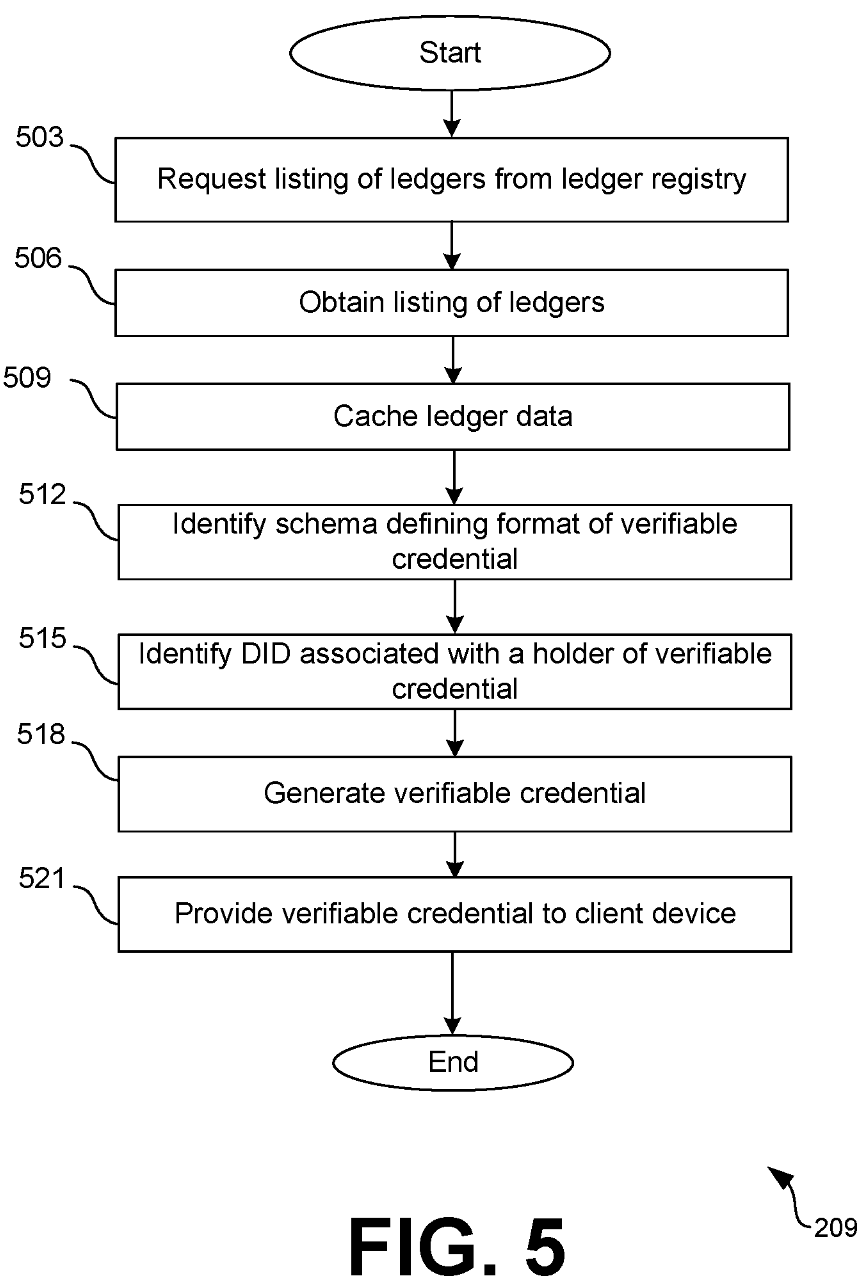
FIG. 5 is a flowchart illustrating one example of functionality implemented as portions of an application executed in a computing environment in the network environment of FIG. 2 according to various embodiments of the present disclosure.

Referring next to FIG. 5, shown is a flowchart that provides one example of the operation of a portion of the issuer service 209. The flowchart of FIG. 5 provides merely an example of the many different types of functional arrangements that can be employed to implement the operation of the depicted portion of the issuer service 209 to generate a verifiable credential 118 provided to a client device 109 of a user 103. As an alternative, the flowchart of FIG. 4 can be viewed as depicting an example of elements of a method implemented within the network environment 200.

First, at step 503, the issuer service 209 can request a listing of ledgers from the ledger registry computing environment 203. The ledger registry 131 provided by the ledger registry computing environment 203 can comprise a registry of distributed ledgers 115 or other types of ledgers that can be utilized by various entities in the network environment 200 of FIG. 2.

At step 506, the issuer service 209 can obtain the listing of ledgers from the ledger registry computing environment 203. The listing of ledgers can be obtained periodically from the ledger registry 131 and/or upon startup of the issuer service 209 on the issuer computing environment 101. At step 509, the issuer service 209 can cache the listing of ledgers in the ledger cache 231.

At step 512, the issuer service 209 can identify a schema defining the format associated with a verifiable credential 118 to be issued to a user 103. The schema can define the claims that are associated with the verifiable credential 118 and specify how a verifier can verify the verifiable credential 118 or a verifiable credential proof 125 generated by the wallet service 112 of a user 103 on behalf of the user and presented to the verifier service 211. For example, the schema can specify what information about the holder is contained within the verifiable credential 118 and how a verifier can verify the information using an issuer public key 227.

At step 515, the issuer service 209 can identify a DID 121 corresponding to the user 103 or holder of the verifiable credential 118. The DID 121 can be associated with a DID document 124 and associated data. The DID 121 can identify one or more of the distributed ledgers 115 on which the DID document 124 is published. The DID 121 can be presented to the issuer service 209 by a wallet service 112 of the user 103 as a part of a request from the client device 109 to generate a verifiable credential 118 for the user 103.

At step 518, the issuer service 209 can generate the verifiable credential 118 that corresponds to the DID 121 of the user 103 and according to the schema defining the format and claims that are made within the verifiable credential 118. identify a schema defining the format and other characteristics of a verifiable credential 118 that can be issued by the issuer service 209 to users 103. The schema can also specify how or whether the verifiable credential 118 can be verified from a verifiable credential proof 125 presented by a wallet service 112 to the verifier service 211.

At step 521, the issuer service 209 can provide the verifiable credential 118 to the wallet service 112 of the user 103 that is executed by the client device 109. The wallet service 112 can store the verifiable credential 118 on the client device 109 and interact with other entities, such as one or more verifiers, to conduct transactions on behalf of the user 103. Thereafter, the process can proceed to completion.

Figure 6:
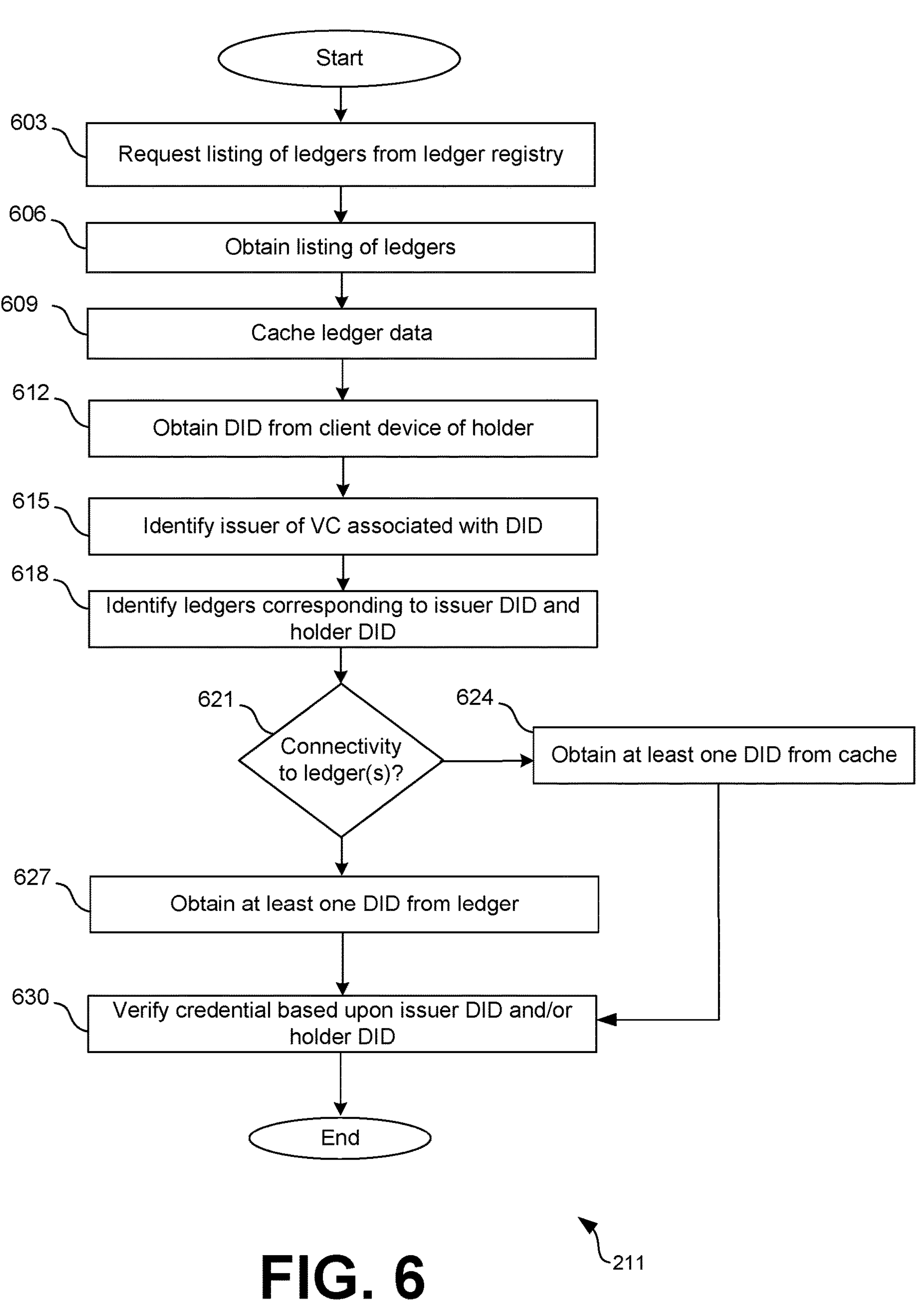
FIG. 6 is a flowchart illustrating one example of functionality implemented as portions of an application executed in a computing environment in the network environment of FIG. 2 according to various embodiments of the present disclosure.

Referring next to FIG. 6, shown is a flowchart that provides one example of the operation of a portion of the verifier service 211. The flowchart of FIG. 6 provides merely an example of the many different types of functional arrangements that can be employed to implement the operation of the depicted portion of the verifier service 211 to verify a verifiable credential 118 presented by a wallet service 112 to the verifier service 211. As an alternative, the flowchart of FIG. 6 can be viewed as depicting an example of elements of a method implemented within the network environment 200.

First, at step 603, the verifier service 211 can request a listing of ledgers from the ledger registry computing environment 203. The ledger registry 131 provided by the ledger registry computing environment 203 can comprise a registry of ledgers 115 that can be utilized by various entities in the network environment 200 of FIG. 2. Stated another way, a ledger registry 131 can be in communication with the issuer computing environment 101, the verifier computing environment 105, and in some cases, a client device 109 associated with users. The ledger registry 131 can provide a listing of ledgers 115 that are utilized by various issuers, verifiers, and wallet services 112 that are utilized by various entities in the trust triangle of FIG. 1.

At step 606, the verifier service 211 can obtain the listing of ledgers from the ledger registry computing environment 203. The listing of ledgers can be obtained periodically from the ledger registry 131 and/or upon startup of the verifier service 211 on the issuer computing environment 101. At step 609, the issuer service 209 can cache the listing of ledgers in the ledger cache 241.

At step 612, the verifier service 211 can obtain a DID 121 of a user 103 from a wallet service 112 associated with the user 103. The DID 121 can be obtained as a part of an interaction with the wallet service 112 to conduct a transaction with the wallet service 112 on behalf of the user. In some examples, the wallet service 112 can present the DID 121 of the user 103 by presenting a verifiable credential 118 to the verifier service 211 or by presenting a verifiable credential proof 125 generated from the verifiable credential 118 to the verifier service 211. In these scenarios, the verifiable credential 118 or the verifiable credential proof 125 can contain or reference the DID 121 of the user 103.

At step 615, the verifier service 211 can identify an issuer of the verifiable credential 118 of the user 103. The issuer can be identified based upon the verifiable credential 118 presented to the 211 or a verifiable credential proof 125. The issuer can be identified by a DID 121 of the issuer that is included in the verifiable credential 118 or verifiable credential proof 125.

At step 618, the verifier service 211 can identify one or more ledgers 115 that correspond to the DID 121 of the issuer. The one or more ledgers 115 can store an issuer public key 227 and/or a schema defining the format of the verifiable credential 118. The schema can also specify how the verifier can verify a verifiable credential proof 125 that could alternatively be presented by the wallet service 112 to the verifier service 211. In some examples, the distributed ledgers 115 can be identified from a listing of ledgers in the ledger cache 241 stored by the verifier service 211 that was retrieved from the ledger registry 131.

At step 621, the verifier service 211 can determine whether one or more ledgers 115 can be accessed by the verifier service 211. For example, if nodes of the distributed ledgers 115 are unavailable due to network connectivity issues, the verifier service 211 might be unable to communicate with one or more of the distributed ledgers 115 to retrieve an issuer public key 227 or a schema.

At step 624, if the distributed ledgers 115 associated with the issuer are unavailable, the verifier service 211 can obtain the DID 121 and/or schema from the ledger cache 241. If one or more of the distributed ledgers 115 can be accessed by the verifier service 211, the process can proceed from step 621 to step 627, and the verifier service 211 can retrieve the DID 121 and/or schema from one of the distributed ledgers 115.

At step 630, the verifier service 211 can verify the verifiable credential 118 or the verifiable credential proof 125 presented by the wallet service 112 to the verifier service 211 using the issuer public key 227 and/or schema. In some cases, the verifier service 211 can utilize other data associated with the DID 121 of the issuer, such as data that is included in the DID document 124 associated with the DID 121 of the issuer. Thereafter, the process can proceed to completion.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams of FIGS. 3-6 show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:

a computing device comprising a processor and a memory; and machine-readable instructions stored in the memory that, when executed by the processor, cause the computing device to at least:

identify a plurality of distributed ledgers from a listing of ledgers by communicating with a ledger registry, the listing of ledgers identifying the plurality of distributed ledgers utilized by at least one issuer and at least one verifier;

identify a schema defining a format of a verifiable credential;

identify a distributed identifier (DID) associated with a holder;

generate the verifiable credential for the DID according to the schema, the verifiable credential comprising an attestation for the DID on behalf of an issuer;

provide the verifiable credential to a client device associated with a holder of the verifiable credential; and publish at least the schema and an issuer DID to a distributed ledger from the plurality of distributed ledgers, the issuer DID corresponding to the issuer that is identified by the listing of ledgers and the issuer DID referencing the distributed ledger from the plurality of distributed ledgers on which a DID document associated with the issuer DID is published.

2. The system of claim 1, wherein the machine-readable instructions, when executed by the processor, cause the computing device to at least:

cache the listing of ledgers obtained from the ledger registry, wherein a cached listing of the plurality of ledgers is accessible without access to a network connection.

3. The system of claim 1, wherein the machine-readable instructions, when executed by the processor, cause the computing device to at least:

obtain an updated listing of ledgers from the ledger registry, wherein the updated listing is obtained periodically.

4. The system of claim 3, wherein the machine-readable instructions, when executed by the processor, cause the computing device to at least:

publish at least the issuer DID and the schema to a second plurality of ledgers based upon the updated listing of ledgers.

5. The system of claim 1, wherein a verifier device identifies a ledger corresponding to the issuer based upon the listing of ledgers obtained from the ledger registry.

6. The system of claim 1, wherein a verifier device verifies the holder based upon a verifiable credential proof presented by a holder device, the issuer DID, and the schema, wherein the verifier device obtains the issuer DID and the schema from the distributed ledger associated with the issuer that is identified by the listing of ledgers.

7. The system of claim 6, wherein the verifier device obtains a public key associated with the issuer from the distributed ledger associated with the issuer, wherein the public key is used to verify the verifiable credential proof.

8. A non-transitory computer-readable medium embodying machine-readable instructions that, when executed by a processor of a computing device, cause the computing device to at least:

identify a plurality of distributed ledgers from a listing of ledgers by communicating with a ledger registry, the listing of ledgers identifying the plurality of distributed ledgers utilized by at least one issuer and at least one verifier;

identify a schema defining a format of a verifiable credential; identify a distributed identifier (DID) associated with a holder;

generate the verifiable credential for the DID according to the schema, the verifiable credential comprising an attestation for the DID on behalf of an issuer;

provide the verifiable credential to a client device associated with a holder of the verifiable credential; and publish at least the schema and an issuer DID to a distributed ledger corresponding to the issuer that is identified by the listing of ledgers, wherein the issuer DID references the distributed ledger from the plurality of distributed ledgers on which a DID document associated with the issuer DID is published.

9. The non-transitory computer-readable medium of claim 8, wherein the machine-readable instructions, when executed by the processor, cause the computing device to at least:

cache the listing of ledgers obtained from the ledger registry, wherein a cached listing of the plurality of ledgers is accessible without access to a network connection.

10. The non-transitory computer-readable medium of claim 8, wherein the machine-readable instructions, when executed by the processor, cause the computing device to at least:

obtain an updated listing of ledgers from the ledger registry, wherein the updated listing is obtained periodically.

11. The non-transitory computer-readable medium of claim 10, wherein the machine-readable instructions, when executed by the processor, cause the computing device to at least:

publish at least the issuer DID and the schema to a second plurality of ledgers based upon the updated listing of ledgers.

12. The non-transitory computer-readable medium of claim 8, wherein a verifier device identifies a ledger corresponding to the issuer based upon the listing of ledgers obtained from the ledger registry.

13. The non-transitory computer-readable medium of claim 8, wherein a verifier device verifies the holder based upon a verifiable credential proof presented by a holder device, the issuer DID, and the schema, wherein the verifier device obtains the issuer DID and the schema from the distributed ledger associated with the issuer that is identified by the listing of ledgers.

14. The non-transitory computer-readable medium of claim 13, wherein the verifier device obtains a public key associated with the issuer from the distributed ledger associated with the issuer, wherein the public key is used to verify the verifiable credential proof.

15. A method, comprising:

identifying a plurality of distributed ledgers from a listing of ledgers by communicating with a ledger registry, the listing of ledgers identifying the plurality of distributed ledgers utilized by at least one issuer and at least one verifier;

identifying a schema defining a format of a verifiable credential; identifying a distributed identifier (DID) associated with a holder; generating the verifiable credential for the DID according to the schema, the verifiable credential comprising an attestation for the DID on behalf of an issuer;

providing the verifiable credential to a client device associated with a holder of the verifiable credential; and publishing at least the schema and an issuer DID to a distributed ledger from the plurality of distributed ledgers, the issuer DID corresponding to the issuer that identified by the listing of ledgers and the issuer DID referencing the distributed ledger from the plurality of distributed ledgers on which a DID document associated with the issuer DID is published.

16. The method of claim 15, further comprising caching the listing of ledgers obtained from the ledger registry, wherein a cached listing of the plurality of ledgers accessible without access to a network connection.

17. The method of claim 15, further comprising obtaining an updated listing of ledgers from the ledger registry, wherein the updated listing is obtained periodically.

18. The method of claim 17, further comprising publishing at least the issuer DID and the schema to a second plurality of ledgers based upon the updated listing of ledgers.

19. The method of claim 15, wherein a verifier device identifies a ledger corresponding to the issuer based upon the listing of ledgers obtained from the ledger registry.

20. The method of claim 15, wherein a verifier device verifies the holder based upon a verifiable credential proof presented by a holder device, the issuer DID, and the schema, wherein the verifier device obtains the issuer DID and the schema from the distributed ledger associated with the issuer that is identified by the listing of ledgers.

* * * * *